US012445769B1

(12) United States Patent
Donley et al.

(10) Patent No.: US 12,445,769 B1
(45) **Date of Patent: *Oct. 14, 2025**

(54) MEMORY RECALL OF SOUND FILTER STORED IN ASSOCIATION WITH A DISCRETE POSE FOR AUDIO BEAMFORMING

(71) Applicant: Meta Platforms Technologies, LLC, Menlo Park, CA (US)

(72) Inventors: Jacob Ryan Donley, Seattle, WA (US); Nava K. Balsam, Woodinville, WA (US); Vladimir Tourbabin, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 18/194,990

(22) Filed: Apr. 3, 2023

Related U.S. Application Data

(63) Continuation of application No. 17/503,565, filed on Oct. 18, 2021, now Pat. No. 11,659,324.

(60) Provisional application No. 63/183,276, filed on May 3, 2021.

(51) Int. Cl.
*H04R 1/40* (2006.01)

(52) U.S. Cl.
CPC .................................... *H04R 1/406* (2013.01)

(58) Field of Classification Search
CPC ... H04R 1/406; H04R 29/005; H04R 2203/12
USPC ........................................ 381/56, 58, 91, 92
See application file for complete search history.

(56) References Cited

U.S. PATENT DOCUMENTS

| | | | | |
|---|---|---|---|---|
| 7,803,050 | B2 * | 9/2010 | Mao | H04R 3/005 463/36 |
| 9,736,580 | B2 | 8/2017 | Cahill et al. | |
| 11,659,324 | B1 | 5/2023 | Donley et al. | |
| 2007/0025562 | A1 * | 2/2007 | Zalewski | H04R 3/005 381/92 |
| 2011/0285807 | A1 | 11/2011 | Feng | |
| 2018/0007487 | A1 * | 1/2018 | Kitazawa | H04S 7/301 |
| 2020/0245065 | A1 * | 7/2020 | Yorga | H04S 7/30 |
| 2021/0092543 | A1 * | 3/2021 | Salehin | H04S 3/006 |
| 2021/0124929 | A1 | 4/2021 | Chae | |

* cited by examiner

*Primary Examiner* — William A Jerez Lora
(74) *Attorney, Agent, or Firm* — Greenberg Traurig, LLP

(57) ABSTRACT

A device and/or method for storing one or more sound filters in a discretized pose space. The device determines that a microphone array during a first time period is in a first discrete pose of a plurality of discrete poses, wherein the plurality of discrete poses discretizes a pose space. The pose space includes at least an orientation component and may further include a translation component. The device retrieves a sound filter associated with the first discrete pose from a memory cache (e.g., for memoization). The device generates audio content using the sound filter and presents the audio content via a transducer array.

18 Claims, 7 Drawing Sheets

MEMORY RECALL OF SOUND FILTER STORED IN ASSOCIATION WITH A DISCRETE POSE FOR AUDIO BEAMFORMING

RELATED APPLICATIONS

This application is a continuation of U.S. patent application Ser. No. 17/503,565, filed Oct. 18, 2021, which claims the benefit of U.S. Provisional Application No. 63/183,276 filed on May 3, 2021, all of which are incorporated by reference.

FIELD OF THE INVENTION

This disclosure relates generally to audio beamforming for use in headsets with audio functionality.

BACKGROUND

Conventional audio systems utilize a single sound filter for audio beamforming, i.e., signal enhancement of target sound sources and signal reduction of interference sound sources. The single sound filter is constantly updated and optimized as the audio system changes between various poses in a pose space. Extensive time is required to constantly collect new data to optimally adapt the sound filter, leading to slow updating of the sound filter and modest beamforming results.

SUMMARY

An audio system used in a headset with audio functionality can employ beamforming techniques to selectively emphasize particular sound sources and/or deemphasize other sound sources. The system captures audio signals from a microphone array. The system segments the audio signals captured by the microphone array into data samples and associates one of a plurality of discrete poses to each data sample based on the pose of the system at that moment. The data samples may be stored in a memory cache, in groups that are each associated with a discrete pose. The system may recall historical data samples, i.e., data samples that are stored in the memory cache, for use in generation and/or updating sound filters for signal enhancement of desired signals and/or signal reduction of undesired signals. The process of recalling historical data samples speeds up generation and/or updating of the sound filters as prior data samples reduce the need to collect copious amounts of data during runtime. Moreover, storing sound filters in association with discrete poses provides for improved beamforming techniques as each sound filter can be tailored to a discrete pose.

Some embodiments relate to method for storing data samples in discrete poses and recalling the stored data samples for audio beamforming. The method includes determining that a microphone array at a first time period is in a first discrete pose of a plurality of discrete poses, wherein the plurality of discrete poses discretizes a pose space. The pose space includes at least an orientation component (also referred to as rotational component) and may further include a translational component. The method includes retrieving one or more historical data samples associated with the first discrete pose, generated from sound captured by the microphone array before the first time period, and stored in a memory cache. The method includes storing a sound filter for the first discrete pose using the retrieved one or more historical data samples. The method includes generation of and presentation of audio content using the updated sound filter.

Additional embodiments relate to an audio system for storing data samples for discrete poses and recalling the stored data samples for audio beamforming. The audio system includes, among other components, a position sensor, a microphone array, a transducer array, a memory cache, and an audio controller. The position sensor is configured to measure an orientation of the audio system. The microphone array is configured to detect sound from a local area of the audio device, the microphone array comprising a plurality of microphones, wherein each microphone is configured to measure an audio signal as the detected sound. The transducer array is configured to present audio content. The memory cache is configured to store one or more data samples. The audio controller is configured to: segment sound detected by the microphone array into one or more data samples, associate a discrete pose of a plurality of discrete poses to each data sample based on the orientation of the audio device as measured by the position sensor during each data sample, store the data samples in the memory cache, update a sound filter associated with a first discrete pose of the plurality of discrete poses using one or more data samples associated with the first discrete pose and stored in the memory cache, and generate audio content for the transducer array using the updated sound filter.

Figure 1A:
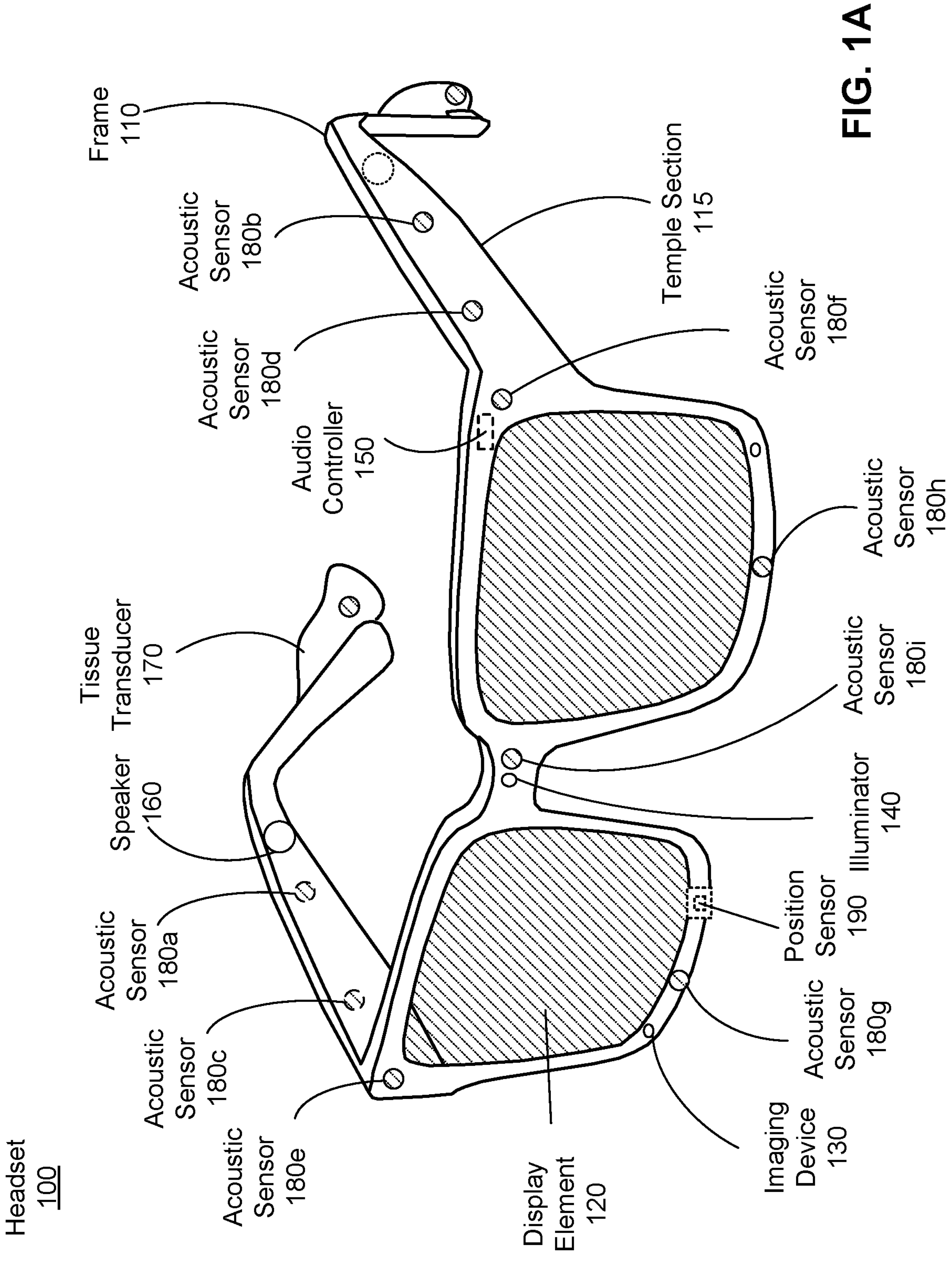
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An audio system used in a headset with audio functionality can employ beamforming techniques to selectively emphasize particular sound sources and/or deemphasize other sound sources. The system captures audio signals from a microphone array, wherein the system can isolate one or more audio signals associated with sound from a particular sound source based on, e.g., different direction of arrival (DOA) estimates. Upon isolation of particular audio signals, the system may generate and apply sound filters for signal enhancement of desired signals and/or signal reduction of undesired signals.

The audio system is configured to store and recall data samples for use in generation and/or updating sound filters, e.g., for beamforming techniques. The audio system includes, among other components, a microphone array, a transducer array, a memory cache, and an audio controller. In some embodiments, the audio system may include a position sensor configured to measure a pose of the audio system, or other components that may be used to determine a pose of the audio system. The microphone array is configured to detect sound from a local area of the audio device. The audio controller may segment the audio signals captured by the microphone array into data samples using a time window. The audio controller may associate each data sample with a discrete pose of a plurality of discrete poses that discretize a pose space of the audio system. The audio controller stores the data samples in buckets (may also be referred to as groups or bins) in the memory cache. The buckets are each associated with a discrete pose (a range of continuous poses). The audio controller is capable of recalling data samples stored in the bucket associated with a discrete pose that is revisited by the audio system in a subsequent time period. The recalled data samples are used by the audio controller for generation and/or updating of a sound filter, which is used to generate audio content. The transducer array is configured to present audio content. In general, this storing and recalling of the data samples relies on the principle of memoization, which is an optimization technique used to speed up computer programs by storing the results of expensive function calls and returning the cached result when the same inputs occur again.

Conventional audio systems used for beamforming techniques rely on collection of data during runtime to generate and/or update a single sound filter. In contrast, the audio system described herein discretizes the pose space and stores data samples associated with the same discrete pose together in the memory cache. The audio system also generates sound filters tailored to each discrete pose. Maintaining a sound filter for each discrete pose provides the opportunity for the audio system to quickly retrieve a previously generated sound filter when revisiting a similar pose. This circumvents the need to regenerate a sound filter when revisiting a pose, thus reducing computing time and resources that a conventional system would have otherwise spent regenerating the sound filter for that previous pose. Maintaining a separate sound filter for each discrete pose also provides for improved audio beamforming compared to conventional methods employing a single sound filter that constantly needs to be updated as a pose constantly changes. Updating a single sound filter with only newly acquired data samples would require extensive collection of data samples to sufficiently optimize the sound filter at a new pose. Time spent collecting data samples necessarily delays the optimization of the sound filter and yields poor beamforming results as spatial information embedded in data samples is smeared over the pose space. Recalling historical data samples can provide the necessary data for sound filter optimization without spending extended time collecting data during runtime and prevents smearing or cross-contamination of spatial information across different poses.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Example Headsets

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The detected sounds may be used to determine properties that are used to generate and apply filters to audio signals. The sensor array includes a plurality of acoustic sensors 180*a* through 180*i* (individually referred to as acoustic sensor 180). An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, separate sound sources, estimate noise statistics, generate sound filters for the speakers 160, or some combination thereof. The audio controller 150 may also be configured to generate sound filters for an audio signal based on audio signals measured by the sensor array. The audio controller 150 may further be configured to store data samples derived from captured audio signals in a plurality of discrete poses for efficient recall during sound filter generation. The sound filters may be used for audio beamforming where the objectives include increasing one or more signals relating to a target source and/or reducing one or more signals relating to an interferer sound source and/or reducing one or more signals relating to ambient background noise. The audio controller 150 applies the sound filters to an audio signal to generate audio content and presents the audio content via a speaker array. Additional details regarding operation of the audio controller 150 are discussed in conjunction with FIGS. 2-5.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 6.

Figure 1B:
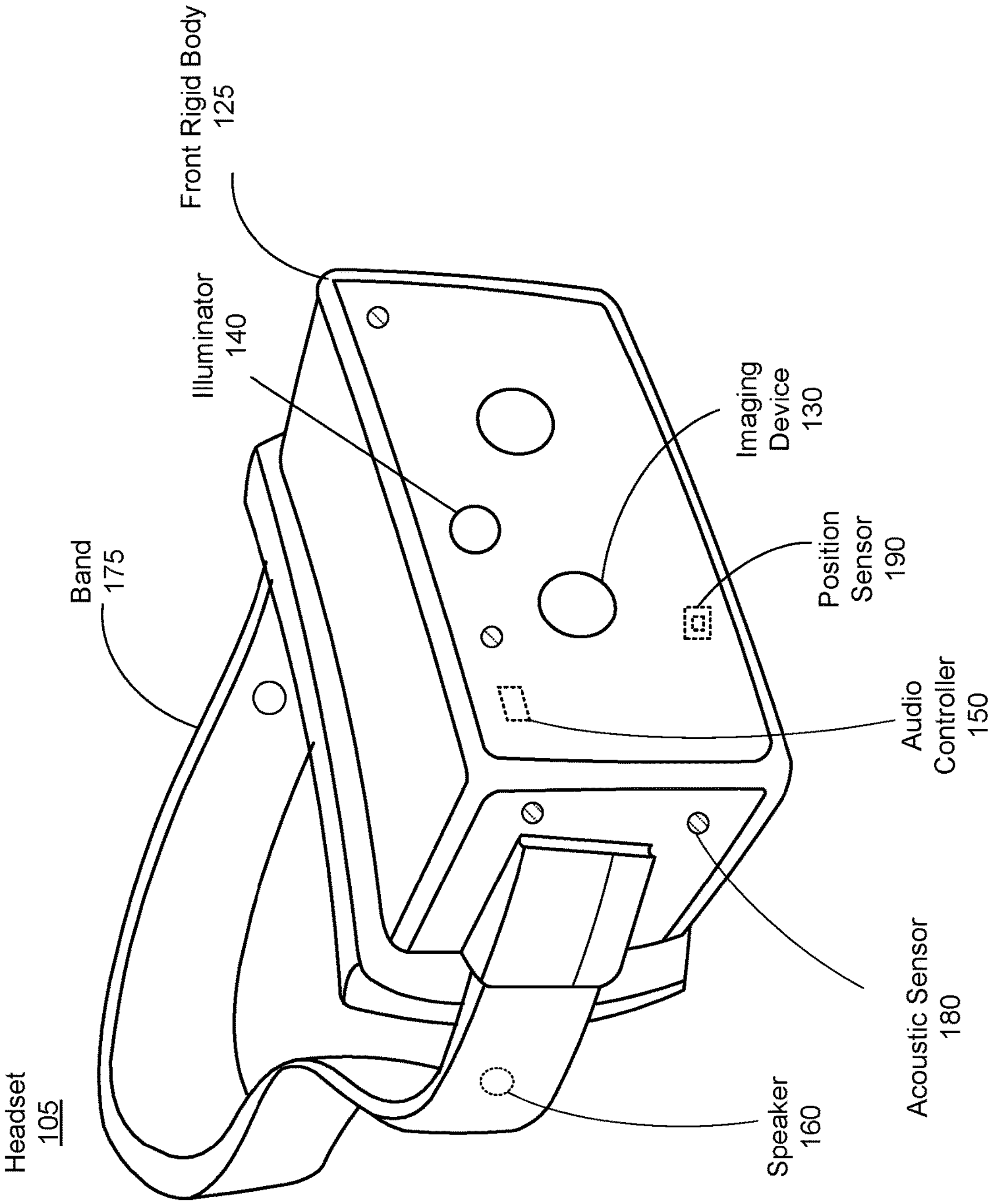
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Audio System

Figure 2:
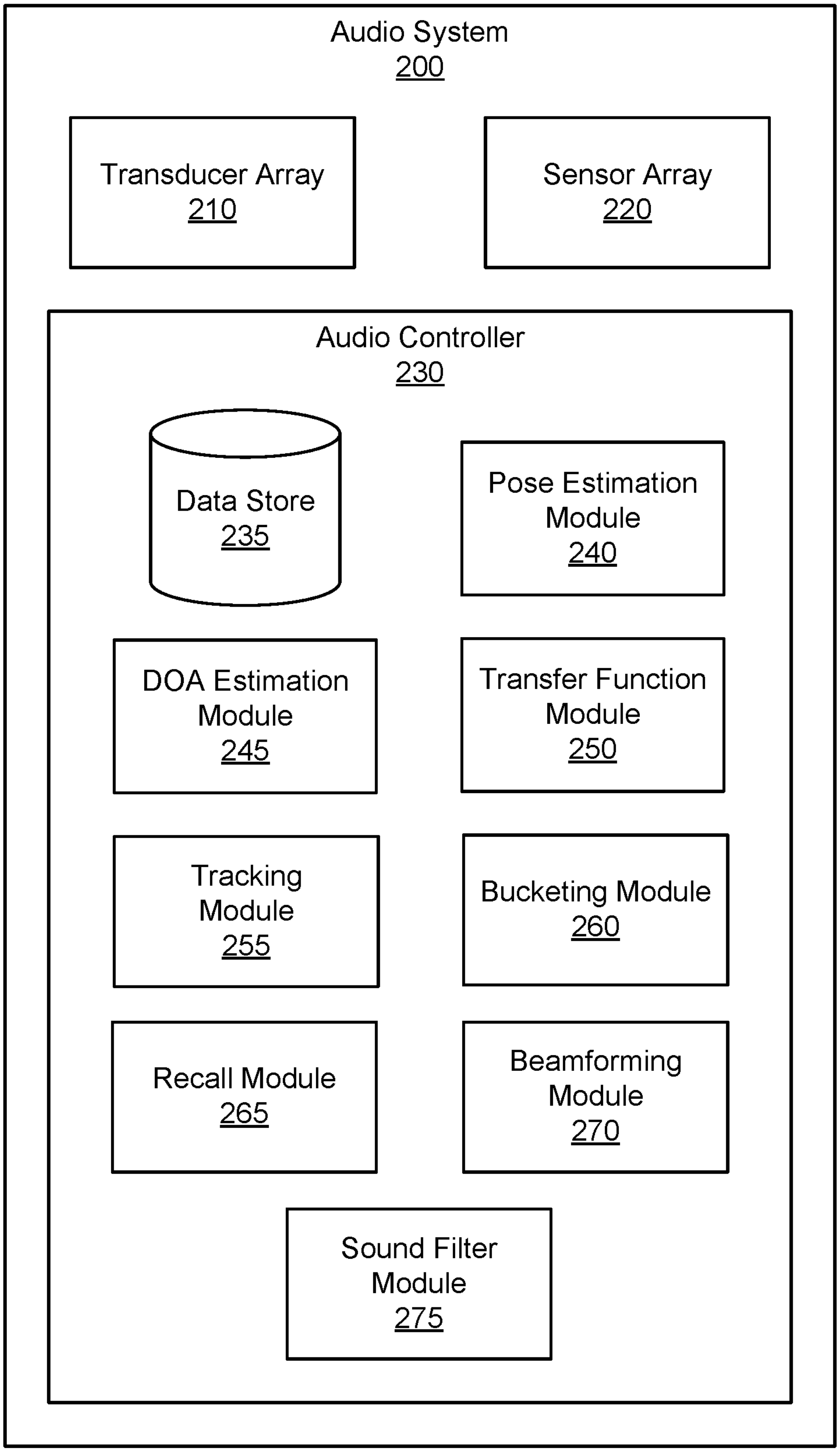
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. In one or more embodiments, the audio system 200 includes one or more components that capture data from which pose may be determined. Examples of such components include a position sensor configured to capture measurement signals relating to motion of the position sensor (e.g., the position sensor 190), one or more imaging devices configured to capture one or more images of a local area (e.g., the imaging device 130). The audio controller 230 may estimate pose of the audio system 200, or more specifically the sensor array 220, from data captured by these components, as will be described further under the audio controller 230. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 (also referred to as a speaker array) generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a pose estimation module 240, a DOA estimation module 245, a transfer function module 250, a tracking module 255, a bucketing module 260, a recall module 265, a beamforming module 270, and a sound filter module 275. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio signals and filtered audio content, sound filters, acoustic parameters of the local area, or any combination thereof. The data store 235 may also store head-related transfer functions (HRTFs), transfer functions for one or more sensors, array transfer functions (ATFs) for one or more of the acoustic sensors, microphone calibration values, sound source locations, virtual model of local area, direction of arrival estimates, other data relevant for use by the audio system 200, or any combination thereof. As relevant to the bucketing module 260 and the recall module 265, the data store 235 may comprise a memory cache for storing data samples derived from audio signals measured by the sensor array 220. The data samples and sound filters are stored in a plurality of buckets for efficient storage and recall. Each bucket is associated with a discrete pose of the pose space. The bucketing module 260 stores data samples mapped to a particular discrete pose in the bucket associated with that discrete pose. The recall module 265 retrieves the historical data samples stored in the bucket when the audio system 200 returns to the discrete pose. The sound filter module 275 may also store one or more sound filters generated and/or updated for the particular discrete pose in its associated bucket in the memory cache.

The pose estimation module 240 determines a pose of the audio system 200 and/or a pose of the sensor array 220. In embodiments where the sensor array 220 is fixed relative to the audio system 200, then the pose of the audio system 200 is the same as the pose of the sensor array 220. In other embodiments where the sensor array 220 may be unfixed relative to the audio system 200, then the pose of the sensor array 220 may be different from the pose of the audio system 200. The pose estimation module 240 determines the pose based on data captured by one or more components of the audio system 200 and/or external components.

In one or more embodiments, the pose estimation module 240 determines the pose based on the audio signals captured by the sensor array 220. The pose estimation module 240 may locate sound sources based on the audio signals and orient the audio system 200 based on the location of the sound sources. For example, the location of two sound sources may be relatively fixed, such that identifying the position of the two sound sources relative to the audio system 200 provides sufficient information to determine the pose of the audio system. In other embodiments, the pose estimation module 240 may extract acoustic properties from the audio signals to determine a pose of the audio system 200.

Embodiments of the audio system 200 including a position sensor or using an external position sensor, the position sensor (e.g., an IMU) may measure a pose of the audio system 200 and/or a pose of the sensor array 220. In other embodiments, the position sensor provides measurement signals relating to motion of the audio system 200 and/or the sensor array 220. The pose estimation module 240 may extrapolate a pose based on the measurement signals and an initial pose of the audio system 200 and/or the sensor array 220.

In embodiments relying on image data from one or more imaging devices, the pose estimation module 240 may analyze the images to determine a pose of the audio system 200 and/or a pose of the sensor array 220. The pose estimation module 240 may analyze the image data to identify features of the local area, e.g., floor, walls, ceiling, horizon, other features that can aid in determining pose, etc. The pose estimation module 240 may determine a pose from the identified features. In other embodiments, one or more external imaging devices may capture images of the audio system 200 and/or the sensor array 220. The pose estimation module 240 may determine the pose of the audio system 200 and/or the sensor array 220 based on a known geometric model of the audio system 200 and/or the sensor array 220. For example, there are external imaging devices placed in a room where the audio system 200 is used. The external imaging devices can capture images of the audio system 200 and/or the sensor array 220, and the pose estimation module 240 may estimate a pose by comparing the images to the known geometric model to determine in which orientation the audio system 200 and/or the sensor array 220 was captured by the external imaging devices. Other embodiments may utilize active or passive tracking components placed on the audio system 200 and/or the sensor array 220, e.g., reflectors or light emitters. The pose estimation module 240 can determine the pose from the position of the tracking components in the captured image data.

In one or more embodiments, the pose estimation module 240 (or an external system) may utilize SLAM to determine a pose and a position while mapping the local area of the audio system 200. In other embodiments, visual-inertial odometry techniques may be applied to captured image data to determine the pose and the velocity of the audio system 200 and/or the sensor array 220.

The DOA estimation module 245 is configured to localize sound sources in the local area based in part on information from the sensor array 220. Localization is a process of determining where sound sources (e.g., including target and interferer sources) are located relative to the user of the audio system 200. The DOA estimation module 245 performs a DOA analysis to localize one or more sound sources within the local area relative to the sensor array 220. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 245 may also determine the DOA with respect to an absolute position of the audio system 200 within the local area. The position and/or pose of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or a pose of some or all of the audio system 200 (e.g., of the sensor array 220). The DOA estimation module 245 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 255 is configured to track locations of one or more sound sources. The tracking module 255 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 255 may determine that the sound source moved. In some embodiments, the tracking module 255 may detect a change in location based on visual information received from the headset or some other external source. The tracking module 255 may track the movement of one or more sound sources over time. The tracking module 255 may store values for a number of sound sources and a location of each sound source at each point in time. In response to a change in a value of the number or locations of the sound sources, the tracking module 255 may determine that a sound source moved. The tracking module 255 may calculate an estimate of the localization variance. The localization variance may be used as a confidence level for each determination of a change in movement.

The bucketing module 260 stores audio signals measured by the sensor array 220 as data samples in a plurality of buckets associated with discrete poses, e.g., stored in a memory cache of the data store 235. The audio signals measured by the sensor array 220 may be ambient noise, test sounds, user speech, other sound from sound sources in a local area, or some combination thereof. The bucketing module 260 receives a pose of the sensor array 220 over time (e.g., as determined by the pose estimation module 240) which is associated with the audio signals captured by the sensor array 220 over time.

The bucketing module 260 temporally segments audio signals captured by the sensor array 290 into data samples using a time window. The time window may be anywhere on the order of hundreds of microseconds (limited by the sampling rate of the audio system) to a couple of seconds, e.g., 100 microseconds, 200 microseconds, 300 microseconds, etc., 100 milliseconds, 200 milliseconds, 300 milliseconds etc., 1 second, 2 seconds, 3 seconds, etc. The time segmentation may also be adaptively segmented using, for example, events from the pose-tracker (e.g., based on a rate of transition between posers (rotational velocity) or the rate of the rate of transitions (rotational acceleration) or from microphone inputs (e.g. a change in the sound field) to trigger a new segment. Each data sample comprises the audio signals captured by the sensor array 220 within the time window. Each data sample may further include a timestamp.

The bucketing module 260 maps the pose of the sensor array 220 for a data sample to a discrete pose of a plurality of discrete poses. The plurality of discrete poses discretizes a pose space inclusive of some or all of the possible poses of the audio system 200. The pose space includes at least an orientation component and may also include a translation component. The orientation component describes a rotation of the audio system 200. The rotation may include one, two, or three degrees of rotational freedom. The translation component describes a translation position of the audio system 200. The translation position may comprise one, two, or three degrees of translational freedom. Each discrete pose may include a range of poses in the pose space, e.g., based on the coordinate system used. In one or more embodiments, different regions of the pose space can be discretized with varying resolution. For example, a first region that is frequently visited by the audio system 200 is discretized at a first resolution, whereas a second region that is less frequented by the audio system 200 is discretized at a second resolution that is different (e.g., larger) than the first. Methods for discretizing a pose space are further discussed in FIG. 3.

As the pose of the sensor array 220 may change over time, each data sample may also include a pose time series over the duration of the data sample. The bucketing module 260 determines one discrete pose to associate with the data sample based on the pose time series. In one embodiment, the sampling occurs at a particular temporal point relative to the time window. As a few examples, the sampling may occur at the beginning of each time window, at some point in the middle of each time window, or at the end of each time window. In other embodiments, the bucketing module 260 may determine which discrete pose the audio system 200 is in for a majority of the time window for the given data sample.

In one or more embodiments, the bucketing module 260 associates neighboring discrete poses. The bucketing module 260 may share data samples and/or previously generated sound filters between neighboring discrete poses. The bucketing module 260 may also establish a correlation between neighboring discrete poses that is based on a cost function, e.g., a signal to noise ratio improvement (SNRi) or some other perceptual metric (e.g., speech quality or speech intelligibility). Gaussian blurring may also be implemented as one manner of correlating neighboring discrete poses.

In one or more embodiments, upon initialization of the audio system 200, the bucketing module 260 is configured to generate a first bucket for a first discrete pose that is based on a first pose of the sensor array 220. The bucketing module 260 may discretize the pose space ahead of initialization. The bucketing module 260 can create the first bucket for the first discrete pose. For example, using Euler angles, the first pose is expressed as (15, 60, 35) in degrees. The bucketing module 260 maps the first pose to the first discrete pose having coordinate intervals (10+10, 50+10, 30+10), given only an orientation component. The bucketing module 260 generates a first bucket and stores the data sample associated with the first pose in the first bucket. As such, a pose having coordinates (6, 55, 27) would map to the first discrete pose and be stored in the first bucket. The bucketing module 260 is configured to generate a second bucket for a second discrete pose upon detecting the sensor array 220 is at another pose that is outside of the first discrete pose. Following the above example, the sensor array 220 is at a pose with coordinates (35, 58, 28), which is no longer within the first discrete pose. The bucketing module 260 generates a second bucket for the discrete pose having coordinate intervals (30+10, 50+10, 30+10). The bucketing module 260 continues to generate new buckets as the audio system 200 arrives at poses outside the pre-existing buckets. This embodiment of generating new buckets as needed provides for an incremental growth rate of buckets, which results in an efficient use of memory (using only what's needed) and a slightly faster recall rate.

In other embodiments, the bucketing module 260 can generate all buckets covering the pose space ahead of initialization. As noted above, the pose space may include an orientation component and a translation component. As such, the discrete poses may additionally include translation positioning of the sensor array 220. As audio signals are captured by the sensor array 220, the bucketing module 260 can determine a discrete pose for each data sample, then store each data sample into the appropriate bucket associated with the determined discrete pose for a given data sample. This embodiment of initializing all buckets saves on processing time, as finding and allocating unused memory on hardware can be expensive in computation and power.

In other embodiments, a hybrid of the two processes can be implemented wherein an initial set of discrete poses are initialized which does not comprehensively cover the entire pose space, then the bucketing module 260 generates additional buckets as needed when the sensor array 220 reaches a pose outside the current set of discrete poses. The size of the initial set of discrete poses can be adjusted to optimize for use of memory, processing time, and recall time.

The bucketing module 260 is also configured to maintain the stored data samples. The bucketing module 260 may retain historical data samples, i.e., data samples that are captured from one or more prior time periods before the current time period, that are within a threshold recency to a current time period. Data samples that have become stale, i.e., are beyond the threshold recency to the current time period, are removed from the memory cache. In one or more embodiments, the memory cache of the data store 235 has a limited size. In such embodiments, the bucketing module 260 may remove historical samples with the oldest timestamp for inclusion of more recent, fresher data samples. In one or more embodiments, the pose space only includes the orientation component, with the discrete poses discretizing only orientation. As the sensor array 220 (or more generally the audio system 200) translates a threshold distance away from the current translation position, the bucketing module 260 may determine the data samples stored in the memory cache as stale. In one or more embodiments, the bucketing module 260 may store the data samples in another system (e.g., a mapping server connected via a network). The data samples may be stored based on positions of the sensor array 220, e.g., all data samples stored in buckets for discrete poses covering orientation collected in a first room are stored under a cache for the first room. In other embodiments, a statistical outlier rejection may be implemented to reject new data that is more than 3 standard deviations from the mean of the bucket. Samples may also be weighted using a recursive averaging (e.g., a logarithmic smoothing) with an adaptive weighting based on pose velocity or acceleration. In one example, if the pose velocity or acceleration is relatively small, then the adaptive weighting may assign large weights to older samples relaying high confidence in the fidelity of the older samples. Alternatively, if the pose velocity or acceleration is large, then the adaptive weighting may assign small weights to older samples relaying diminished confidence in the fidelity of those samples.

The recall module 265 retrieves one or more historical data samples from the memory cache of the data store 235. Based on a current pose of the sensor array 220 (e.g., as determined by the pose estimation module 240), the recall module 265 maps the current pose to one of the discrete poses. For example, the current pose falls within the coordinate intervals for a first discrete pose, thus the recall module 265 maps the current pose to the first discrete pose. The recall module 265 identifies whether there are any historical data samples stored for the current discrete pose, e.g., whether there is an existing bucket associated with the current discrete pose or whether there are any data samples currently stored in the bucket associated with the current discrete pose. The recall module 265 may further confirm whether the historical data samples stored in a bucket are fresh or stale, e.g., whether the data samples are within a threshold time from the current timestamp. The recall module 265 retrieves usable historical data samples stored in the bucket associated with the identified discrete pose. The recall module 265 may also retrieve any sound filters stored in the bucket for the identified discrete pose, e.g., wherein the sound filter module 275 may update the sound filter. The retrieved historical data samples are provided to the sound filter module 275 for generation and/or update of the sound filters. Providing historical data samples to the sound filter module 275 provides for improved fine tuning of sound filters compared to methods that require and solely rely on collection of audio signals during runtime in order to generate and/or update a sound filter. In one or more embodiments, the recall module 265 may also retrieve historical data samples stored on an external system (e.g., a mapping server connected via a network). For example, the recall module 265 may identify that the sensor array 220 (or more generally the audio system 200) is in a first room, the recall module 265 queries the mapping server for historical samples stored in buckets for discrete poses covering orientation collected in the first room in a prior time period.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 245 and the tracking module 255. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 275 determines sound filters for the transducer array 210 based on sounds detected by the sensor array 220. The sound filter module 275 may generate a sound filter for each of a plurality of discrete poses of the audio system 200. When the audio system 200 has a pose that is encompassed in a first discrete pose, then the first sound filter for the first discrete pose is utilized for generation of audio content. Generating a sound filter for each discrete pose is advantageous in that a previously generated sound filter trained for a particular discrete pose can be applied when the audio system 200 returns to a similar pose, reducing computing time and resources that would have been otherwise spent regenerating the sound filter for that previous pose. Maintaining a separate sound filter for each discrete pose also provides for improved beamforming of target sound sources compared to conventional methods employing a single sound filter that constantly needs to be updated as a pose constantly changes. The data samples used by the sound filter module 275 may be provided directly by the sensor array 220 and may be provided by the recall module 290. Historical data samples (i.e., captured before the current time period) provide additional data for the sound filter module 275 to generate and/or to update the sound filters, which provides for quicker updating of a sound filter associated with a current pose of the audio system 200. The sound filter module 275 stores the generated and/or updated sound filters in the bucket for the appropriate discrete poses. For example, the sound filter module 275 updates a first sound filter for a first discrete pose, and the sound filter module 275 stores the first sound filter in a first bucket associated with the first discrete pose. In one or more embodiments, the sound filter module 275 may initialize or update a sound filter for a first discrete pose based on a previously generated sound filter for a neighboring discrete pose to the first discrete pose. The sound filter module 275 may initialize or update by utilizing data samples and/or sound filters in buckets for neighboring discrete poses, extrapolating data samples from those buckets, or by interpolating between two adjacent discrete poses.

The sound filters may, e.g., be designed to adjust (e.g., attenuate or amplify) the sound from a particular sound source, globally adjust (e.g., attenuate or amplify) sound in a local area; adjust acoustic parameters of a room to make it sounds as if the sound is occurring in a different physical environment (e.g., make a living room sound like a concert hall), some other effect on the sound, or some combination thereof. In some embodiments, the sound filters cause the audio content to be spatialized, such that the audio content appears to originate from a target region. The sound filter module 275 may use HRTFs, ATFs, other transfer functions, and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 275 calculates one or more of the acoustic parameters. In some embodiments, the sound filter module 275 requests the acoustic parameters from a mapping server (e.g., as described below with regard to FIG. 6).

In some embodiments, the generated sound filters are provided to the in-ear devices, and the in-ear devices generate the adjusted sound that is presented to the user. In some embodiments, the generated filters provided to the transducer array and are such that the transducer array presents audio content using the generated filters, and the audio content combines with sound from the local area to form the adjusted sound which is presented to the user. And in some embodiments, the generated sound filters are provided to both the transducer array 210 and the in-ear devices, such that the audio content generated by the transducer array combines with audio content generated by the in-ear devices and the sound from the local area to generate the adjusted sound.

Figure 3:
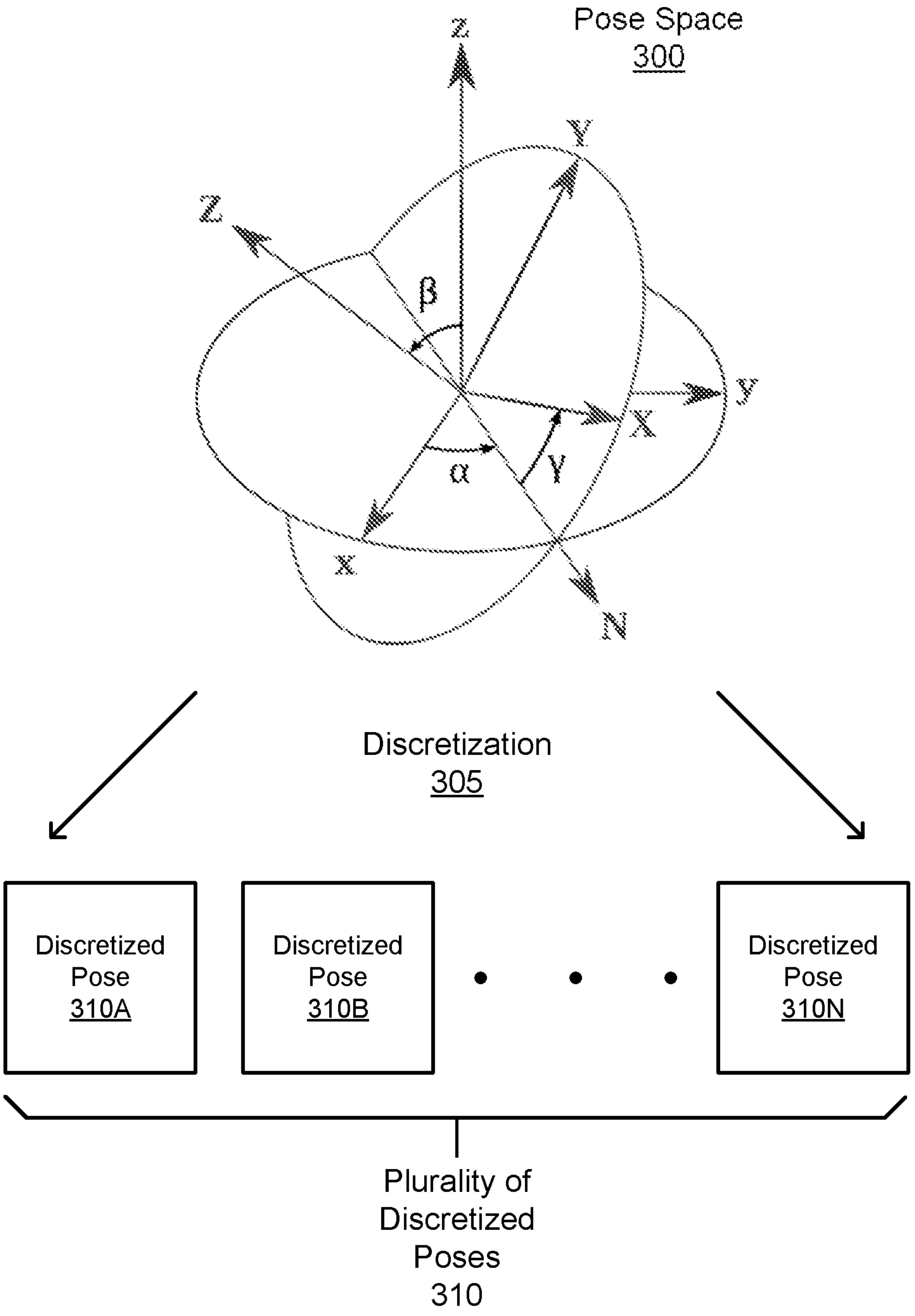
FIG. 3 illustrates discretization of a pose space into a plurality of discrete poses, in accordance with one or more embodiments.

FIG. 3 illustrates discretization 305 of a pose space 300 into a plurality of discrete poses 310, in accordance with one or more embodiments. The pose space 300 includes at least an orientation component and may further include a translation component. Once discretized, the discrete poses 310 may include discrete pose 310A, discrete pose 310B, and up to discrete pose 310N. N is an arbitrarily assigned variable that indicates any positive integer, such that a total number of discrete poses may be any positive integer.

The orientation component describes a rotation of the sensor array 220. The rotation may comprise one, two, or three degrees of rotational freedom (e.g. as represented by a 3×3 rotation matrix). The rotation can be described in one of many rotational coordinate systems. The coordinate system may be, e.g., based on Euler angles, based on axis-angles, based on quaternions, based on a rotation matrix, based on some other rotational system, or some combination thereof. A coordinate system based on Euler angles is shown in FIG. 3. The lowercase x, y, and z axes are fixed. The orientation of the sensor array 220 is shown as uppercase X, Y, and Z with coordinates for the Euler angles as (α, β, γ). In a first example with the coordinate system based on Euler angles, the orientation component of the pose space can be discretized by 10° sections in each of three Euler angles. As a result, a first discrete pose in the Euler-angles coordinate system includes rotational coordinates within the range of (0, 0, 0) to (10, 10, 10), a second discrete pose in includes rotational coordinates within the range of (10, 10, 10) to (20, 20, 20). Other embodiments, each coordinate can have different ranges. For example, the first coordinate is partitioned in 10° sections, while the second coordinate partitioned in 5° sections. In a preferred embodiment, each discrete pose has a unique range of coordinates in the coordinate system from other discrete poses to prevent storage of a particular data sample in different buckets.

The translation component describes a translation position of the audio system, which may include one, two, or three degrees of translational freedom. The translation position can be described in any one of many translational coordinate systems. One common coordinate system is three-dimensional Euclidean space, comprised of three orthogonal axes which form the basis for the Euclidean space. As shown in FIG. 3, the fixed system (lowercase x, y, and z axes) can measure translation position of the audio system in Cartesian coordinates. With the inclusion of the translation component, each discrete pose includes both a range of rotational coordinates and a range of translational coordinates.

Upon discretization of the pose space, the plurality of discrete poses covers some or all of the pose space. The discrete poses may evenly partition the pose space, e.g., the size of each discrete pose is the same including the same range of rotational coordinates. In other embodiments, different regions of the pose space may be discretized with varying resolution. This may provide for tiering various region of the pose space for discretization at different resolution. For example, a first-tier region is most frequently visited and is discretized at a fine resolution, with small ranges of rotational coordinates, a second-tier region is seldom visited and is discretized at a coarse resolution, with large ranges of rotational coordinates.

Figure 4:
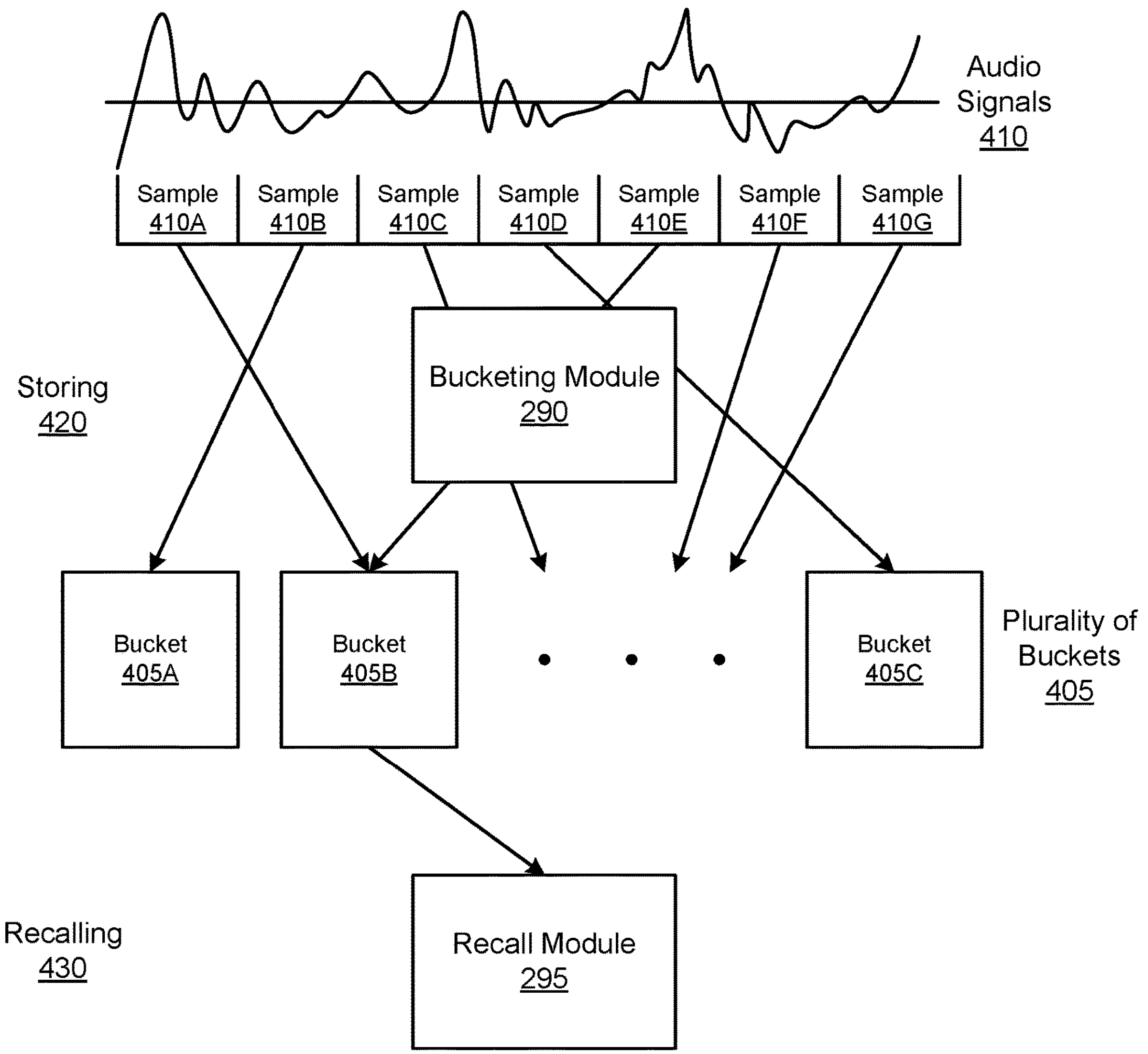
FIG. 4 illustrates storing data samples in a plurality of discrete poses and recalling the data samples from the plurality of discrete poses, in accordance with one or more embodiments.

FIG. 4 illustrates storing 420 data samples in a plurality of discrete poses and recalling 430 the data samples from the plurality of discrete poses, in accordance with one or more embodiments. In general, the storing 420 of data samples occurs at a first time period prior to the recalling 430 of data samples at a second time period that is later than the first time period. Audio signals 410 are captured by a sensor array (e.g., the sensor array 220 of the audio system 200). The audio signals 410 may comprise a signal per sensor of the sensory array. The audio signals 410 are segmented into data samples, e.g., using a time window. In FIG. 4, the audio signals 410 are segmented into sample 410A, sample 410B, sample 410C, sample 410D, sample 410E, sample 410F, and sample 410G.

At the storing 420 step, the bucketing module 260 stores the data samples into a plurality of buckets 405 associated with discrete poses, e.g., as derived in FIG. 3. For each data sample, the bucketing module 260 maps the pose of the sensor array 220 over the duration of the data sample to a discrete pose. The bucketing module 260 then stores the data sample into a bucket associated with the discrete pose. For example, the bucketing module 260 determines that sample 410A relates to the audio system 200 in a pose that is mapped to a second discrete pose associated with bucket 405B. As such, the bucketing module 260 stores sample 410A under bucket 405B. Sample 410B is stored under bucket 405A. Sample 410D is stored under bucket 405C. Sample 410E is stored under bucket 405B. Relatively speaking, sample 410A and sample 410E were derived from audio signals when the sensor array 220 was in the same or similar poses, i.e., within the second discrete pose associated with bucket 405B. Sample 410C, sample 410F, and sample 410G are stored in other discrete poses not shown in FIG. 4.

At the recalling 430 step, the recall module 265 retrieves one or more data samples from the discrete poses 310, e.g., stored in the memory cache. The recall module 265 maps a current pose of the sensor array 220 (e.g., as determined by the pose estimation module 240) to the second discrete pose associated with bucket 405B. The recall module 265 retrieves data samples stored in bucket 405B, such as sample 410A and sample 410E. The samples are provided to the sound filter module 275 to generate and/or to update a sound filter associated with the second discrete pose. The generated and/or updated sound filter is used to generate audio content for presentation by the transducer array 210 of the audio system 200. The generated audio content has improved beamforming characteristics, i.e., better signal enhancement for target sound sources compared to signal reduction for interference or undesired sound sources. The generated and/or updated sound filter for the second discrete pose may be stored in the bucket 405B.

Figure 5:
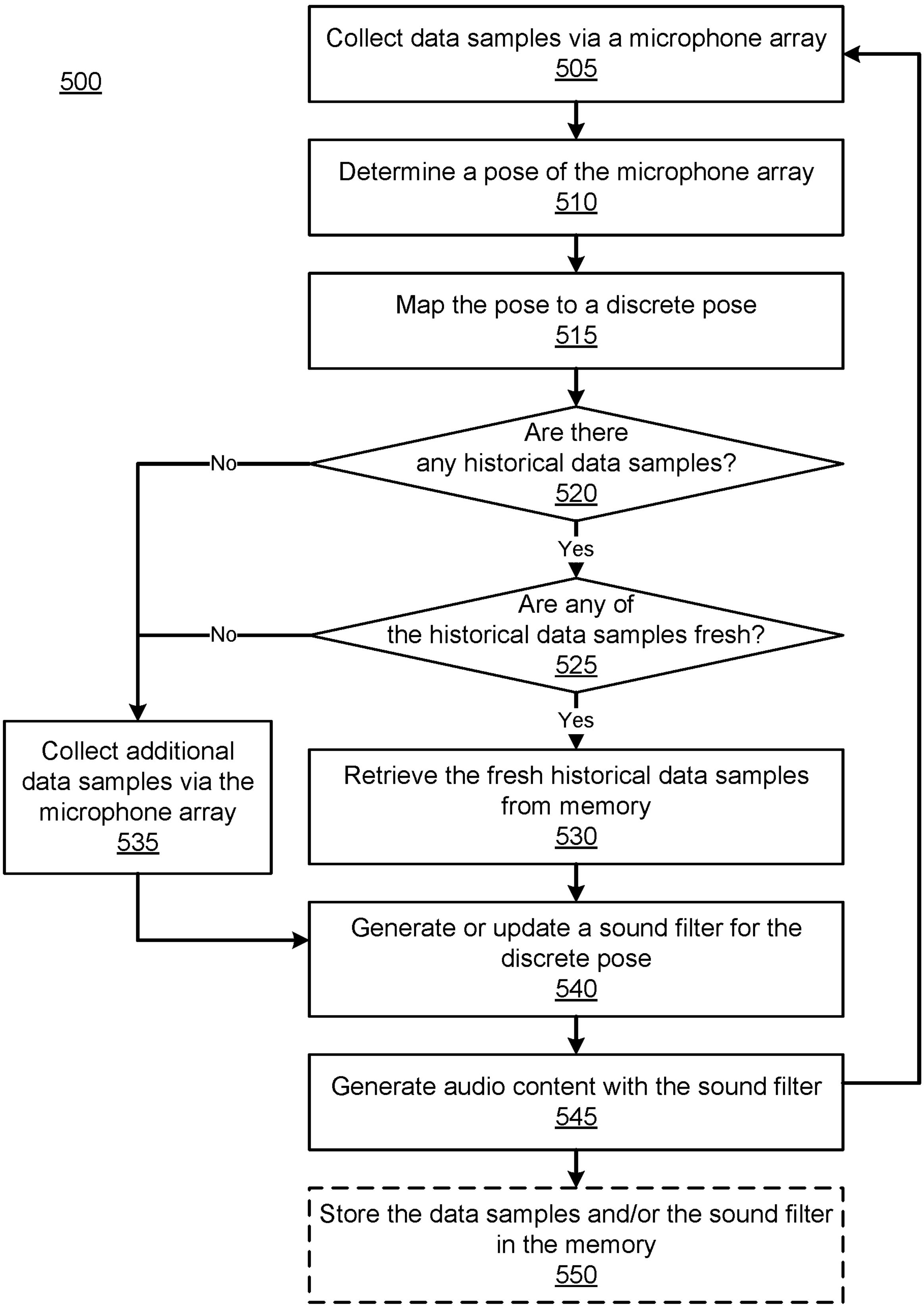
FIG. 5 is a flowchart of a method for storing and recalling data samples stored in a plurality of discrete poses, in accordance with one or more embodiments.

FIG. 5 is a flowchart of a method 500 for recalling data samples stored in a plurality of discrete poses, in accordance with one or more embodiments. For discussion purposes, the method 500 is described as being performed by the audio system 200. In other embodiments, particular components and/or modules of the audio system 200 can be used to perform each step of the method 500. In additional embodiments, other devices (e.g., the headset 100 of FIG. 1A or the headset 105 of FIG. 1B) can perform some or all of the steps of method 500. Other embodiments of the method 500 may include additional, fewer, or different steps than those described herein.

The audio system 200 collects 505 data samples via a microphone array. The microphone array may be an embodiment of the sensor array 220. The microphone array captures audio signals which may be segmented by the audio system 200 into data samples.

The audio system 200 determines 510 a pose of the microphone array. The audio system 200 may determine the pose according to data captured from one or more components external to the audio system 200, e.g., a position sensor, an IMU, one or more imaging devices, etc. In some embodiments, the pose is determined from the other components and provided to the audio system 200. In other embodiments, the audio system 200 analyzes the data to determine the pose, e.g., compare the image data captured by an imaging device of a local area from a perspective of the audio system 200 to determine a pose of the microphone array.

The audio system 200 maps 515 the pose of the microphone array to a discrete pose. In one or more embodiments, the audio system 200 discretizes a pose space into a plurality of discrete poses. Discretization of the pose space is detailed in FIG. 3. Each discrete pose includes a range of coordinates (e.g., rotational coordinates, translational coordinates, or a combination thereof). The audio system 200 may map each data sample to a particular discrete pose, based on a pose of the audio system 200 during the data sample.

The audio system 200 determines 520 whether there are any historical data samples associated with a current discrete pose relating to a current pose of the microphone array. Historical data samples are derived from audio signals captured by the microphone array at a previous time period and stored in a memory cache of the audio system 200. The historical samples are stored in buckets, with each bucket associated with a discrete pose. The audio system 200 checks whether a bucket exists for the current discrete pose, or whether there are any historical samples stored in the bucket for the current discrete pose.

If there are historical samples stored in the bucket for the current pose, the audio system 200 determines 525 whether any of the historical data samples are fresh. The audio system 200 has one or more criteria for determining whether a historical data sample is fresh or usable. At least one criterium is a threshold recency. The audio system 200 checks whether the historical data samples are within the threshold recency of the current timestamp. Historical data samples beyond the threshold recency are deemed stale, while historical data samples within the threshold recency are deemed fresh.

If there are fresh historical data samples, the audio system 200 retrieves 530 the fresh historical data samples from the bucket associated with the current discrete pose in the memory cache. The audio system 200 may also retrieve a sound filter previously generated for the current discrete pose that is also stored in the bucket in the memory cache.

If there are no historical data samples, or none of the historical data samples are fresh, then the audio system 200 collects 535 additional data samples via the microphone array. In some embodiments, the audio system 200 may use a default sound filter, e.g., while collecting the additional data samples. The default sound filter may include a spatial white noise covariance, a diffuse noise covariance, other sound filter parameter(s), or some combination thereof.

The audio system 200 generates or updates 540 the sound filter for the current discrete pose. In embodiments without a previously generated sound filter, the audio system 200 generates a new sound filter. In some embodiments, the audio system 200 may initialize a sound filter from a sound filter for an adjacent discrete pose, from a separately stored set of sound filters, or from an online server. In embodiments with a previously generated sound filter, the audio system 200 may update the sound filter. The audio system 200 generates or updates the sound filter using the data samples collected at step 505, the fresh historical data samples retrieved at step 530, the additional data samples collected at step 535, or some combination thereof.

Maintaining a sound filter for each discrete pose provides the opportunity for the audio system 200 to quickly retrieve a previously generated sound filter when revisiting a similar pose. This circumvents the need to regenerate a sound filter when revisiting a pose, thus reducing computing time and resources that would have been otherwise spent regenerating the sound filter for that previous pose. Maintaining a separate sound filter for each discrete pose also provides for improved beamforming of target sound sources compared to conventional methods employing a single sound filter that constantly needs to be updated as a pose constantly changes. The audio system 200 updates the single sound filter for the current pose. When the pose of the audio system 200 is changed, then the updated sound filter is no longer optimized for the new pose. Updating the sound filter with only newly acquired data samples would require collecting sufficient data samples to optimize the sound filter at the new pose. Time spent collecting data samples necessarily delays the optimization of the sound filter. Recalling historical data samples can provide the necessary data for sound filter optimization without spending extended time collecting data during runtime and avoid data samples recorded from other poses contaminating the estimated sound filter at the current pose.

The audio system 200 generates 545 audio content with the sound filter. The generated and/or updated sound filter can be used for beamforming, i.e., signal enhancement of target sound sources and/or signal reduction of undesired sound sources. The audio system 200 presents the audio content, e.g., via the transducer array 210. The audio content may be presented standalone, accompanied with visual content, or provided in an augmented reality context.

The audio system 200 may repeat the method 500 to continually provide audio content that is generated with the sound filters. In one embodiment, the audio system 200 remains in one pose, and the audio system 200 repeats the method 500 to further refine and update the sound filter to improve beamforming. In another embodiment, the audio system 200 moves to a different pose that maps to a different discrete pose than the prior pose. In those embodiments, the audio system 200 repeats the method 500 to recall historical data samples and/or sound filters for generation of audio content in the different discrete pose.

In one or more embodiments, the audio system 200 stores 550 the data samples and/or the sound filter in the memory cache. The data samples stored may be the ones collected at step 505 and/or the additional ones collected at step 535. The audio system 200 stores 550 the data samples in the appropriate bucket for each data sample, i.e., based on the discrete pose of the data sample. The data samples may be stored with a timestamp for checking whether the data sample is fresh or stale at step 525 during a subsequent operation of the method 500. The audio system 200 may also store the data samples in an external system, e.g., a mapping server that is connected to the audio system 200 via a network.

System Environment

Figure 6:
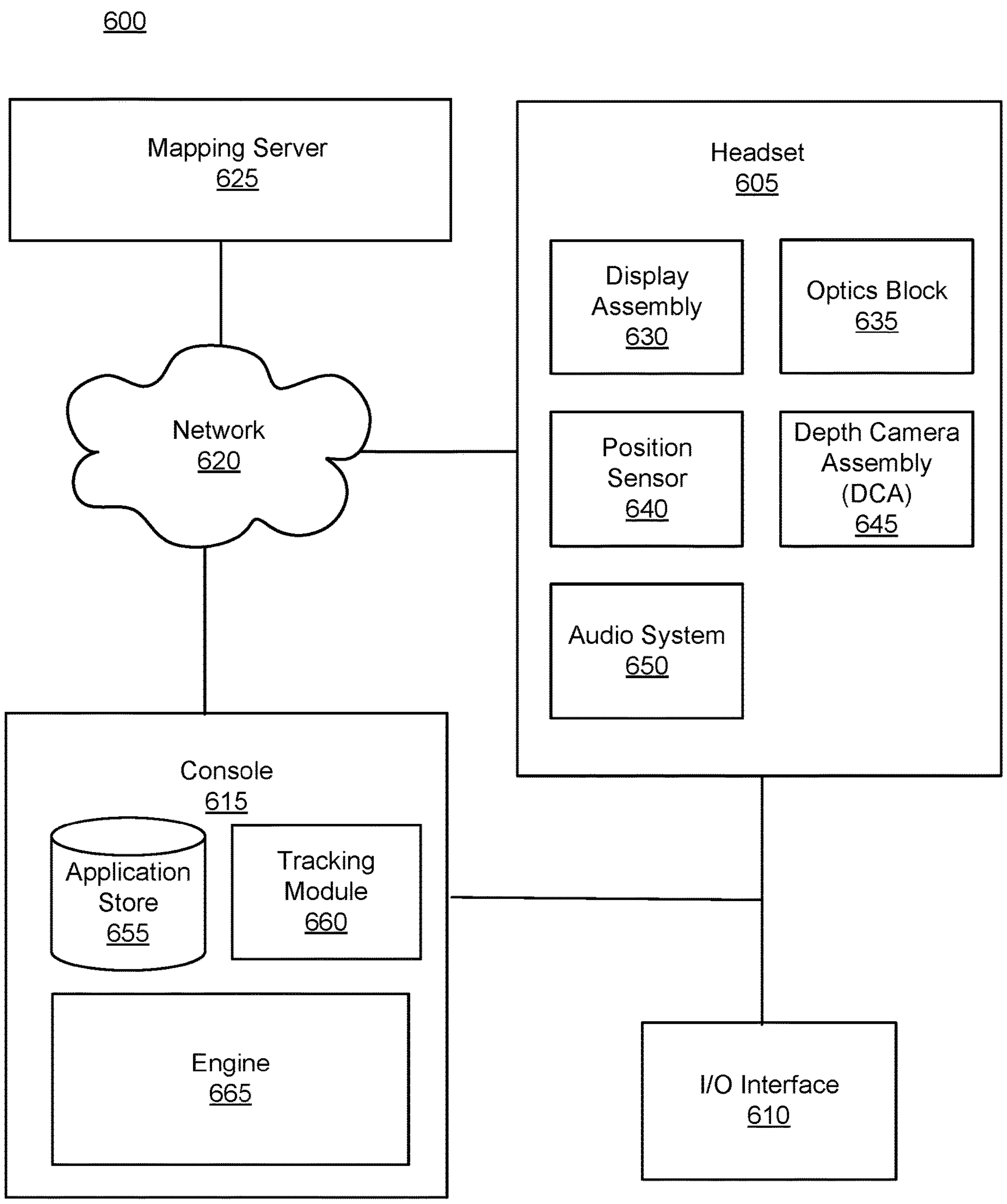
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The audio system 650 provides audio content to a user of the headset 605. The audio system 650 is an embodiment of the audio system 200 described above. The audio system 650 may comprise one or acoustic sensors, one or more transducers, and an audio controller. The audio system 650 may provide spatialized audio content to the user. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640.

As described for the audio system 200, the audio system 650 is configured to store data samples in a plurality of buckets associated with discrete poses in a memory cache and to recall the stored data samples for use in updating sound filters during runtime. The discrete poses discretize a pose space, wherein the pose space includes at least an orientation component and may further include a translation component. As the audio system 650 moves from pose to pose, the audio system 650 is configured to recall or retrieve historical data samples stored in the buckets associated with the discrete poses for use in updating sound filters. The sound filters are used to generate and provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. In one or more embodiments, the tracking module 660 is configured to further track a pose of the headset 605 and the audio system 650, which can be provided to the audio system 650 for use in storing and recalling data samples. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 602.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The user may adjust privacy settings to allow or prevent the headset 605 from transmitting information to the mapping server 625. The mapping server 625 determines, based on the received information and/or location information, a location in the virtual model that is associated with the local area of the headset 605. The mapping server 625 determines (or retrieves) a pose of the headset 605 (or the audio system 605), one or more acoustic parameters associated with the local area, based in part on the determined location in the virtual model and any acoustic parameters associated with the determined location. The mapping server 625 may transmit the pose of the headset 605, the location of the local area and any values of acoustic parameters associated with the local area to the headset 605. The pose determined by the mapping server 625 can be used by the audio system 650 to store and recall data samples captured by the audio system 650 in the plurality of discrete poses.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

determining that a microphone array during a first time period is in a first discrete pose of a plurality of discrete poses, wherein the plurality of discrete poses discretizes a pose space;

retrieving a sound filter associated with the first discrete pose from a memory cache, wherein the sound filter is generated using a set of data samples identified as associated the first discrete pose from one or more data samples, and wherein each data sample of the one or more data samples comprises an audio signal captured by each microphone of the microphone array during a given time window in a second time period that is before the first time period;

generating audio content using the sound filter; and presenting, via a transducer array, the audio content.

2. The method of claim 1, further comprising:

detecting, via the microphone array, sound from a local area during the second time period;

segmenting the detected sound into the one or more data samples using a time window, wherein each data sample comprises an audio signal measured by each microphone of the microphone array during a given time window;

associating a discrete pose of the plurality of discrete poses to each data sample;

identifying a respective set of data samples associated with each discrete pose of the plurality of discrete poses; and generating a respective sound filter associated with each discrete pose of the plurality of discrete poses using the respective set of data samples associated with the discrete pose.

3. The method of claim 2, further comprising:

storing the one or more data samples as historical data samples in the memory cache.

4. The method of claim 3, further comprising:

removing from the memory cache one or more historical data samples generated from sound captured in a time period that is greater than a threshold time before the first time period.

5. The method of claim 1, further comprising:

detecting, via the microphone array, sound from a local area during the first time period;

generating a first data sample associated with the first discrete pose from the sound detected in the first time period; and updating the sound filter for the first discrete pose using the first data sample, wherein the audio content is generated using the updated sound filter.

6. The method of claim 1, wherein each discrete pose of the plurality of discrete poses has a unique range of coordinates in a coordinate system from other discrete poses of the plurality of discrete poses.

7. The method of claim 1, wherein a first region of the pose space is discretized at a first resolution and a second region of the pose space is discretized at a second resolution that is different from the first resolution.

8. The method of claim 1, wherein the memory cache is located on an external server.

9. A non-transitory computer-readable storage medium storing instructions that, when executed by a computer processor of a device, cause the device to:

determine that a microphone array during a first time period is in a first discrete pose of a plurality of discrete poses, wherein the plurality of discrete poses discretizes a pose space;

retrieve a sound filter associated with the first discrete pose from a memory cache, wherein the sound filter is generated using a set of data samples identified as associated the first discrete pose from one or more data samples, and wherein each data sample of the one or more data samples comprises an audio signal captured by each microphone of the microphone array during a given time window in a second time period that is before the first time period;

generate audio content using the sound filter; and present, via a transducer array, the audio content.

10. The non-transitory computer-readable storage medium of claim 9, further comprising stored instructions that when executed cause the device to:

detect, via the microphone array, sound from a local area during the second time period;

segment the detected sound into the one or more data samples using a time window, wherein each data sample comprises an audio signal measured by each microphone of the microphone array during a given time window;

associate a discrete pose of the plurality of discrete poses to each data sample;

identify a respective set of data samples associated with each discrete pose of the plurality of discrete poses; and generate a respective sound filter associated with each discrete pose of the plurality of discrete poses using the respective set of data samples associated with the discrete pose.

11. The non-transitory computer-readable storage medium of claim 9, further comprising stored instructions that when executed cause the device to:

store the one or more data samples as historical data samples in the memory cache.

12. The non-transitory computer-readable storage medium of claim 11, further comprising stored instructions that when executed cause the device to: remove from the memory cache one or more historical data samples generated from sound captured in a time period that is greater than a threshold time before the first time period.

13. The non-transitory computer-readable storage medium of claim 9, further comprising stored instructions that when executed cause the device to:

detect, via the microphone array, sound from a local area during the first time period;

generate a first data sample associated with the first discrete pose from the sound detected in the first time period; and update the sound filter for the first discrete pose using the first data sample, wherein the audio content is generated using the updated sound filter.

14. The non-transitory computer-readable storage medium of claim 9, wherein each discrete pose of the plurality of discrete poses has a unique range of coordinates in a coordinate system from other discrete poses of the plurality of discrete poses.

15. The non-transitory computer-readable storage medium of claim 9, wherein a first region of the pose space is discretized at a first resolution and a second region of the pose space is discretized at a second resolution that is different from the first resolution.

16. The non-transitory computer-readable storage medium of claim 9, wherein the memory cache is located on an external server.

17. A device comprising:

a position sensor configured to measure an orientation of the device;

a memory cache configured to store one or more data samples or one or more sound filters;

a transducer array comprising one or more transducers configured to present audio content;

a microphone array configured to detect sound from a local area of the device, the microphone array comprising a plurality of microphones; and an audio controller configured to: determine, via the position sensor, that the device during a first time period is in a first discrete pose of a plurality of discrete poses, wherein the plurality of discrete poses discretizes a pose space;

retrieve, from the memory cache, a sound filter associated with the first discrete pose, wherein the sound filter is generated using a set of data samples identified as associated the first discrete pose from one or more data samples, and wherein each data sample of the one or more data samples comprises an audio signal captured by each microphone of the microphone array during a given time window in a second time period that is before the first time period;

generate audio content using the sound filter; and present, via the transducer array, the audio content.

18. The device of claim 17, wherein the audio controller is further configured to:

detect, via the microphone array, sound from the local area during the second time period;

segment the detected sound into the one or more data samples using a time window, wherein each data sample comprises an audio signal measured by each microphone of the microphone array during a given time window;

associate a discrete pose of the plurality of discrete poses to each data sample;

identify a respective set of data samples associated with each discrete pose of the plurality of discrete poses; and generate a respective sound filter associated with each discrete pose of the plurality of discrete poses using the respective set of data samples associated with the first discrete pose.

* * * * *